(12) United States Patent
Son et al.

(10) Patent No.: US 11,852,909 B2
(45) Date of Patent: *Dec. 26, 2023

(54) DISPLAY DEVICE AND METHOD OF MANUFACTURING THE SAME

(71) Applicant: LG Display Co., Ltd., Seoul (KR)

(72) Inventors: Ji-Cheol Son, Gumi-si (KR); Sung-Sik Son, Gumi-si (KR); Chan-Hyeok Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,697

(22) Filed: Apr. 6, 2022

(65) Prior Publication Data

US 2022/0229326 A1 Jul. 21, 2022

Related U.S. Application Data

(62) Division of application No. 16/452,477, filed on Jun. 25, 2019, now Pat. No. 11,320,681.

(30) Foreign Application Priority Data

Aug. 13, 2018 (KR) ........................ 10-2018-0094238

(51) Int. Cl.
*G02F 1/1333* (2006.01)
*G02F 1/1335* (2006.01)
*B32B 7/12* (2006.01)

(52) U.S. Cl.
CPC .... *G02F 1/133308* (2013.01); *G02F 1/13338* (2013.01); *G02F 1/133528* (2013.01); *B32B 7/12* (2013.01); *G02F 1/133331* (2021.01); *G02F 2202/28* (2013.01)

(58) Field of Classification Search
CPC ........... G02F 1/13338; G02F 1/133308; G02F 1/133528; G02F 1/133331
See application file for complete search history.

(56) References Cited

U.S. PATENT DOCUMENTS

| | | | |
|---|---|---|---|
| 9,143,668 | B2 | 9/2015 | Mathew et al. |
| 10,009,525 | B2 | 6/2018 | Mathew et al. |
| 10,866,461 | B2 | 12/2020 | Nakamura et al. |

(Continued)

FOREIGN PATENT DOCUMENTS

| JP | 2012-098726 A | 5/2012 |
|---|---|---|
| KR | 10-2017-0103159 A | 9/2017 |
| KR | 10-2017-0111827 A | 10/2017 |

OTHER PUBLICATIONS

United States Office Action, U.S. Appl. No. 16/452,477, dated Sep. 15, 2021, eight pages.

(Continued)

*Primary Examiner* — Dung T Nguyen
(74) *Attorney, Agent, or Firm* — Fenwick & West LLP

(57) ABSTRACT

A display device is disclosed. The display device includes a cover glass, a liquid crystal panel disposed below the cover glass and having a transparent portion, an upper polarization plate having a through hole corresponding to the transparent portion and disposed between the cover glass and the liquid crystal panel, an OCA film disposed between the cover glass and the upper polarization plate and attached thereto, and an OCR layer charged in the through hole.

7 Claims, 6 Drawing Sheets

(56) References Cited

U.S. PATENT DOCUMENTS

| | | | |
|---|---|---|---|
| 11,057,556 B2 | 7/2021 | Chen et al. | |
| 11,183,133 B2* | 11/2021 | Lim | |
| 11,320,681 B2* | 5/2022 | Son | G02F 1/133528 |
| 2012/0094071 A1* | 4/2012 | Itoh | G06F 3/045 |
| | | | 428/206 |
| 2012/0105400 A1 | 5/2012 | Mathew et al. | |
| 2016/0212311 A1 | 7/2016 | Mathew et al. | |
| 2017/0287992 A1 | 10/2017 | Kwak et al. | |
| 2019/0023946 A1 | 1/2019 | Kim | |
| 2019/0243427 A1 | 8/2019 | Nakamura et al. | |
| 2019/0278132 A1 | 9/2019 | Nakamura et al. | |
| 2019/0306296 A1 | 10/2019 | Cheng | |
| 2020/0117034 A1 | 4/2020 | Yin et al. | |
| 2020/0137899 A1 | 4/2020 | Lin et al. | |
| 2020/0258957 A1 | 8/2020 | Kwak et al. | |
| 2020/0286436 A1 | 9/2020 | Lim | |

OTHER PUBLICATIONS

United States Office Action, U.S. Appl. No. 16/452,477, dated Mar. 18, 2021, six pages.
United States Office Action, U.S. Appl. No. 16/452,477, dated Sep. 16, 2020, six pages.
United States Office Action, U.S. Appl. No. 16/452,477, dated May 29, 2020, seven pages.

* cited by examiner

FIG. 1A
FIG. 1B
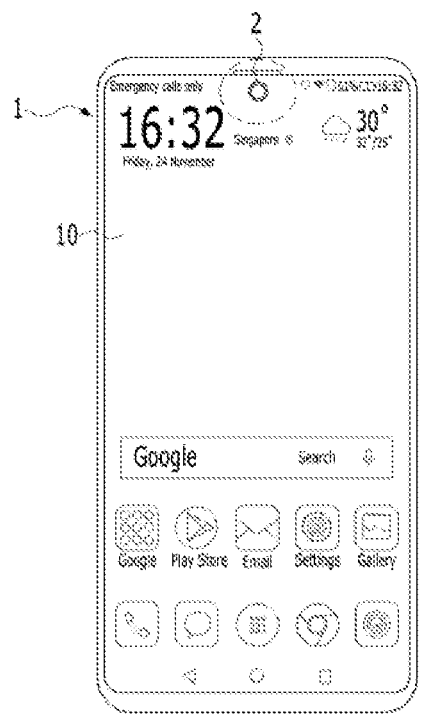
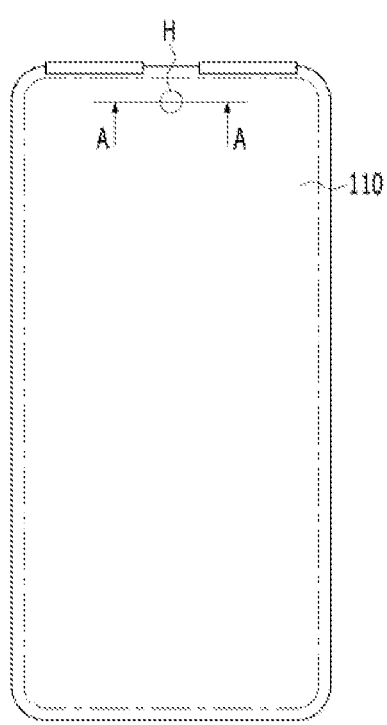

DISPLAY DEVICE AND METHOD OF MANUFACTURING THE SAME

CROSS-REFERENCE TO RELATED APPLICATIONS

This application is a divisional of U.S. patent application Ser. No. 16/452,477 filed on Jun. 25, 2019, which claims the benefit of Republic of Korean Patent Application No. 10-2018-0094238, filed on Aug. 13, 2018, each of which is incorporated by reference in its entirety.

BACKGROUND

Field of Technology

The present disclosure relates to a display device, and more particularly, to a display device equipped with a camera.

Discussion of the Related Art

In the recent information society, a display device, which is a medium for conveying visual information, is receiving a lot of attention. In order to hold a prominent position in the future, it is desirable for such a display device to satisfy criteria such as low power consumption, reduction of weight and improvement of image quality.

Displays may be classified into self-luminescent display devices, which emit light by themselves, such as a cathode ray tube (CRT), an electroluminescence element (EL), a light-emitting diode (LED), a vacuum fluorescent display (VFD), a field emission display (FED) and a plasma display panel (PDP), and non-luminescent display devices, which cannot emit light by themselves, such as a liquid crystal display (LCD).

Among these various displays, the liquid crystal display device is intended to display an image using the optical anisotropy of the liquid crystal. Since the liquid crystal display device provides more better visibility than a conventional cathode ray tube and reduces both average power consumption and heat discharge compared to a cathode ray tube having the same screen size, it is attracting a lot of attention as a display.

The liquid crystal display device is constructed so as to realize an image in such a way as to control the transmissivity of light emitted from a light source disposed below the liquid crystal by applying an electric field to the liquid crystal and thus controlling the alignment of the liquid crystal. The liquid crystal device is applied to various electronic devices such as smart phones and tablet PCs. In particular, the liquid crystal device includes a cover glass, a liquid crystal panel disposed below the cover glass, a backlight unit disposed below the liquid crystal panel and a cover bottom for accommodating or supporting the liquid crystal panel or the backlight unit.

Since the recent display device is intended to have a slim bezel having a small thickness and to have an ultrathin display panel, demand for a slim and light display device is increasing.

In the recent mobile devices, it is desirable for a display device to have a narrow bezel, in which the width of a bezel is minimized so as to maximally expand the visible range of a liquid crystal panel, rather than the slim bezel.

To this end, when the liquid crystal panel is expanded to the whole front surface of a display device equipped with a camera so as to realize a narrow bezel, the liquid crystal panel may expand into the region to which the camera is mounted. In this case, the camera hole regions of the liquid crystal panel, the polarization plate and the backlight unit, at which the camera is mounted, have to be provided with punched through holes or have to be transparent.

SUMMARY

Accordingly, the present disclosure is directed to a display device and a method of manufacturing the same that substantially obviate one or more problems due to limitations and disadvantages of the related art.

An object of the present disclosure is to provide a display device, which is a narrow-bezel-type display device equipped with a camera and which is able to realize improvement of transparency for image capture by the camera, suppression of creation of air gaps, and improvement of waterproof performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a cover glass, a liquid crystal panel disposed below the cover glass and having a transparent portion, an upper polarization plate having a through hole corresponding to the transparent portion and disposed between the cover glass and the liquid crystal panel, an Optically Clear Adhesive (OCA) film disposed between the cover glass and the upper polarization plate and attached thereto, and Optical Clear Resin (OCR) layer charged in the through hole of the upper polarization plate.

The OCA film may have a thickness of 150 micrometers (μm) to 250 μm.

The OCR layer may have the same thickness as the upper polarization plate.

The OCR layer may have a thickness of 100 μm to 150 μm.

The display device may further include a backlight light unit providing light to liquid crystal panel and having a first camera hole, and a lower polarization plate having a second camera hole and disposed between the liquid crystal panel and the backlight light unit, wherein the first camera hole and the second camera hole corresponds to the transparent portion of the liquid crystal panel and the through hole of the upper polarization plate.

The display device may further include a cover bottom having a third camera hole corresponding to the first and second camera holes and holding the backlight light unit and the liquid crystal panel, and a camera disposed in the first to third camera hole.

The backlight light unit may include optical sheets, a light guide plate, and a reflective plate. The first camera hole may penetrate the optical sheets, the light guide plate, and the reflective plate.

The cover glass may further include a touch panel.

In another aspect of the present disclosure, a display device includes a display panel having a transparent portion, a cover substrate on the display panel, a polarization plate having a through hole corresponding to the transparent portion of the display panel and disposed between the cover substrate and the display panel, an OCA film disposed between the cover substrate and the polarization plate and attached thereto, and an OCR layer disposed in the through hole of the polarization plate. The cover substrate may further include a touch panel.

The OCR layer in the through hole of the polarization plate and the transparent portion of the display panel may correspond to at least one optical module including at least one of cameras and optical sensors.

In another aspect of the present disclosure, a method of manufacturing a display device includes preparing a display panel and a polarization plate on the display panel, the display panel having a transparent portion and the polarization plate having a through hole corresponding to the transparent portion of the display panel, disposing an OCR layer in the through hole of the polarization plate, attaching an OCA film to a cover substrate, and closely combining the polarization plate with the OCA film attached to the cover substrate.

The disposing the OCR layer in the through hole may comprise spraying OCR spray liquid onto the transparent portion of the display panel so as to charge the OCR layer in the through hole of the polarization plate, and curing the OCR layer. The OCR layer may be charged in the through hole of the polarization plate in such a manner that the OCR spray liquid is sprayed onto a plurality of dots on the transparent portion of the display panel, the dots being spaced apart from each other at regular intervals, and the OCR spray liquid spreads out on the transparent portion of the display panel.

The OCR layer charged in the through hole may be cured by ultraviolet light.

It is to be understood that both the foregoing general description and the following detailed are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s), and together with the description serve to explain the principle of the invention. In the drawings:

FIGS. 1A and 1B illustrate a display device equipped with a camera according to an embodiment, in which FIG. 1A is a front view of the display device, and FIG. 1B is a front view of the display device, from which a cover glass and an upper cover are removed;

DETAILED DESCRIPTION

Figure 2:
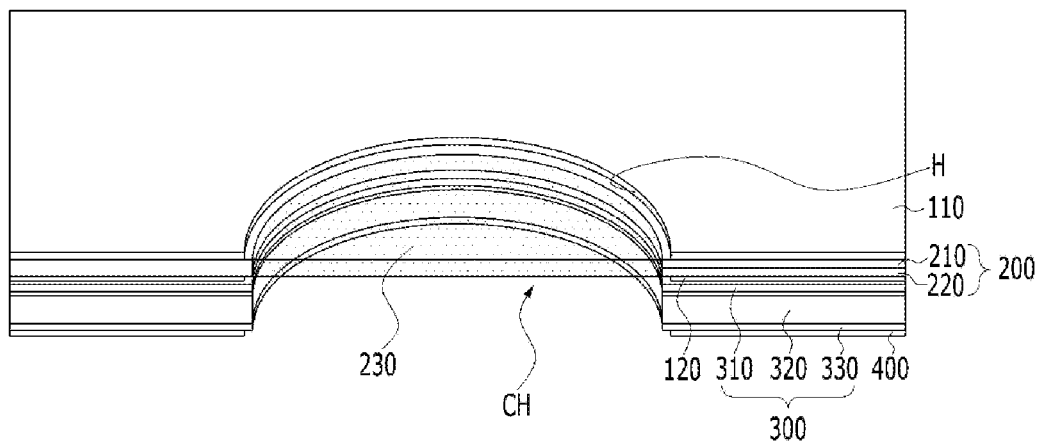
FIG. 2 is a perspective view taken along line A-A in FIG. 1B, according to an embodiment.

Hereinafter, embodiments will be clearly revealed via description thereof with reference to the accompanying drawings. In the following description of the embodiments, it will be understood that, when an element such as a layer, film, region, pattern, or structure is referred to as being "on" or "under" another element, it can be "directly" on or under another element or can be "indirectly" formed such that an intervening element may also be present. In addition, it will also be understood that the criteria for "on" or "under" are determined on the basis of the drawings.

In the drawings, the size of each constituent element is exaggerated, omitted, or schematically illustrated for convenience of description and clarity. Also, the size of each constituent element does not entirely reflect the actual size thereof. The same reference numbers will be used throughout the drawings to refer to the same or like parts.

Hereinafter, embodiments will be described with reference to the accompanying drawings.

FIG. 1A illustrates a front view of a display device equipped with a camera according to an embodiment, and FIG. 1B is a front view of the display device from which a cover glass and an upper cover are removed. FIG. 2 is a perspective view taken along line A-A in FIG. 1B.

Referring to FIGS. 1A and 1B, the display device 1 according to the embodiment includes the camera 2 provided on the front surface thereof, and is constructed so as to realize a narrow bezel, the bezel having a reduced width so as to expand the visible range of a liquid crystal panel 200, covered by a cover glass (substrate) 10, as wide as possible.

The cover glass 10 may include a protective film (not shown) provided on the upper surface thereof. Furthermore, the cover glass 10 may include a touch panel (not shown). The touch panel may be classified into a pressure-sensitive type, in which sensor lines, which are adapted to respond to pressure applied to the surface thereof, are densely arranged so as to recognize the coordinates of a location to which pressure is applied, and an electrostatic type, in which an electric charge is applied to the surface of the cover glass 10 and sensors are provided therearound so as to recognize a contact location on the surface by detecting the extent to which the charge is lost in the event of contact.

As illustrated in FIG. 1B, an upper polarization plate 110 is disposed beneath the cover glass 10, and a through hole H is formed in the upper polarization plate 110 through punching so as to allow operation of the camera 2.

As illustrated in FIG. 2, the through hole H, which is formed in the upper polarization plate 110, may have a location and size corresponding to those of a camera hole CH in which the camera (not shown in FIG. 2) is mounted.

The liquid crystal panel 200 may be disposed between the through hole H and the camera hole CH, and may have a transparent portion 230, which is disposed between the through hole H and the camera hole CH.

The liquid crystal panel 200 includes a color filter substrate 210, in which pixels are arranged in a matrix pattern so as to output an image, an array substrate 220 combined with the color filter substrate 210 so as to form a cell gap therebetween, and a liquid crystal layer (not shown) formed in the cell gap between the color filter substrate 210 and the array substrate 220.

The color filter substrate 210 may be composed of a color filter, which is constituted by a plurality of sub color filters for realizing red, green and blue (RGB) colors, a black matrix for isolating the sub color filters from each other and blocking the light transmitted through the liquid crystal layer, and an overcoat layer formed on the color filter and the black matrix.

The array substrate 220 is provided with gate lines and data lines, which are arranged in horizontal and vertical directions so as to form pixel regions, and thin film transistors (TFT), which are switching elements, are formed on the cross regions between the gate lines and the data lines. Each of the thin film transistors is composed of a gate electrode connected to the gate line, a source electrode connected to the data line, and a drain electrode connected to a pixel electrode. Any one of the array substrate 220 and the color filter substrate 210 includes a common electrode.

The liquid crystal panel 200, in which the color filter substrate 210 and the array substrate 220 are combined with each other, is provided with the common electrode and the pixel electrode so as to apply an electric field to the liquid crystal layer and to control the voltage of a data signal applied to the pixel electrode in the state in which voltage is applied to the common electrode. Therefore, the liquid crystal in the liquid crystal layer is rotated due to the dielectric anisotropy according to an electric field between the common electrode and the pixel electrode so as to allow or block the transmission of light from the pixels, thereby displaying a character or an image. Here, in order to independently control the voltage of a data signal applied to the pixel electrodes, the switching elements, such as the thin film transistors, are respectively provided at the pixels.

The transparent portion 230 of the liquid crystal panel 200 may be configured to have a shape and size corresponding to those of the camera hole CH and the through hole H, and may be maintained in the transparent state so as to allow image capture by the camera 2. For example, the transparent portion 230 may perform control so as to make a partial region of the liquid crystal panel 200 transparent in a manner of controlling or removing the sub filters in the color filter substrate 210.

The polarization plates 110 and 120 may be respectively attached to the upper surface of the color filter substrate 210 and the lower surface of the array substrate 220. Here, the lower polarization plate 120 functions to polarize light that has passed through a backlight unit 300 toward the array substrate 220, and the upper polarization plate 110 functions to polarize light that has passed through the liquid crystal panel 200.

The backlight unit 300 may include a light guide plate 320 disposed below the liquid crystal panel 200, a plurality of optical sheets 310 for radiating light exiting the light guide plate 320 to the liquid crystal panel 200 with improved efficiency, and a reflective plate 330.

The light guide plate 320 receives light from a light source (not shown) and guides the light toward the liquid crystal panel 200. The light guide plate 320 may be made of a plastic material of polymethylmethacrylate (PMMA) or polycarbonate (PC).

The optical sheet 310 may include a diffusion sheet and a prism sheet, and may further include a brightness enhancement film and a protective sheet, such as dual brightness enhancement film (DBEF). The optical sheet 310 may be disposed between the upper surface of the light guide plate 320 and the rear surface of the liquid crystal panel 200.

The reflective plate 330 is disposed between a cover bottom 400 and the rear surface of the light guide plate 320. The reflective plate 330 reflects both light emitted from the light source and light reflected by the light guide plate 320 toward the liquid crystal panel 200. The light emitted from the light source enters the lateral surface of the light guide plate 320, which is made of a transparent material, and the reflective plate 330, which is disposed on the rear surface of the light guide plate 320, reflects the light that exits the rear surface of the light guide plate 320 toward the optical sheet 310 on the light guide plate 320, thereby realizing reduction of light loss and improvement in uniformity of luminance.

The backlight unit 300, which includes the above-mentioned components, is received in the cover bottom 400. The backlight unit 300 is not limited to the above-described structure, and any of backlight units 300 having other structures may be applied to the display device 1.

The cover bottom 400 may receive therein the backlight unit 300 and a guide panel, and may support the liquid crystal panel 200. For example, the cover bottom 400 may be composed only of a bottom part and a lateral part in order to realize a minimized slim bezel region. Specifically, the cover bottom 400 may include the bottom part having a rectangular shape and the lateral part projecting upwards from one side of the bottom part by a predetermined height. The cover bottom 400 is only for illustrative purposes, and any of cover bottoms 400 having various shapes may be applied to the display device 1.

In the display device 1 according to the embodiment, the through hole H is formed through the upper polarization plate 110, and the camera hole CH, in which the camera 2 is mounted, is formed though the backlight unit 300 and the cover bottom 400. The transparent portion 230 in the liquid crystal panel 200 is disposed between the through hole H and the camera hole CH.

Figure 3:
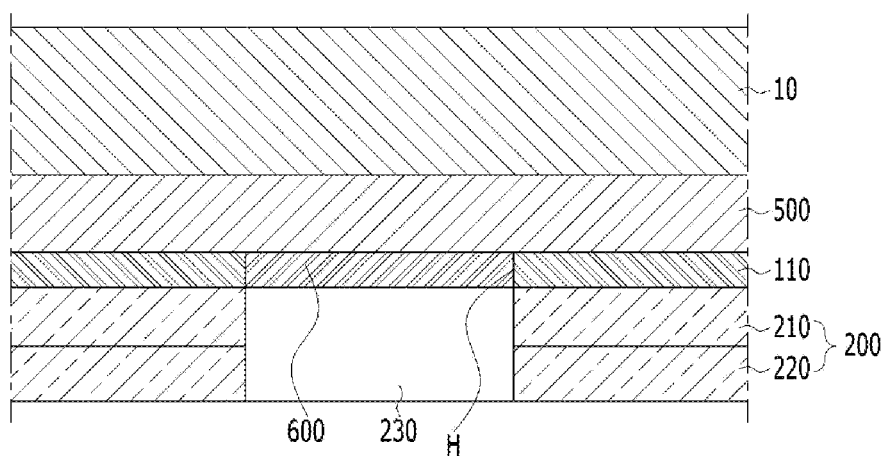
FIG. 3 is a cross-sectional view of a substantial part of the display device according to an embodiment.
Figure 4:
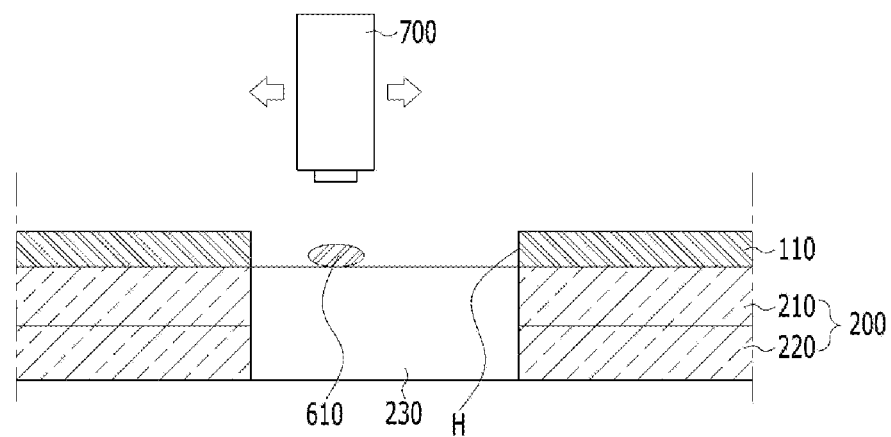
FIG. 4 is a view showing a procedure in which the OCR resin shown in FIG. 3 is applied to a through hole, according to an embodiment.
Figure 6:
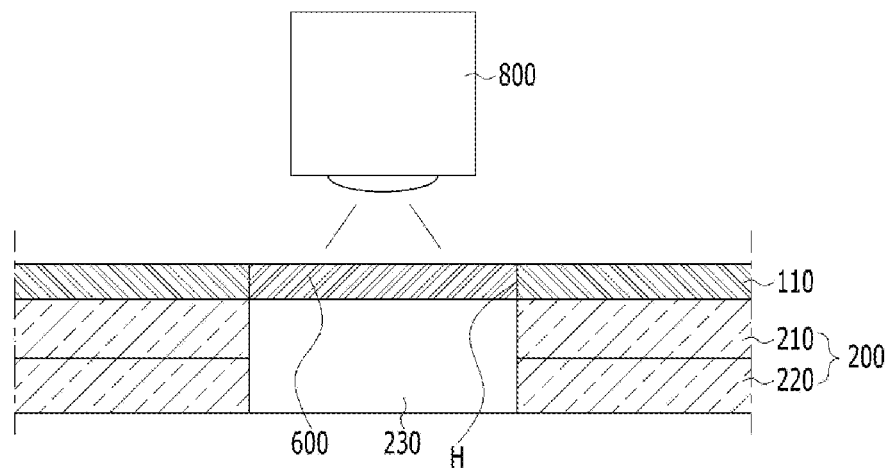
FIG. 6 is a view showing a procedure in which the OCR layer is cured by an ultraviolet lamp, according to an embodiment.
Figure 7:
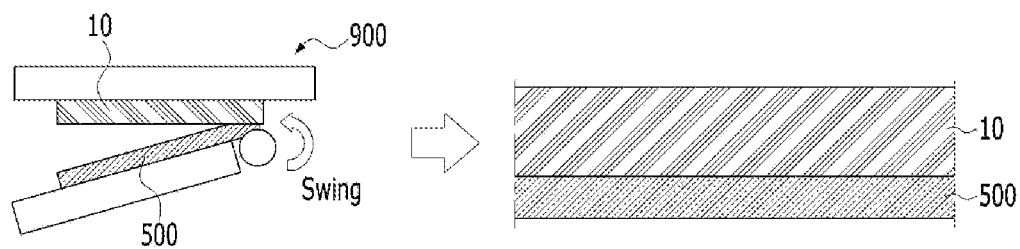
FIG. 7 is a view showing a procedure in which an OCA film is attached to the cover glass in FIG. 3, according to an embodiment.
Figure 8:
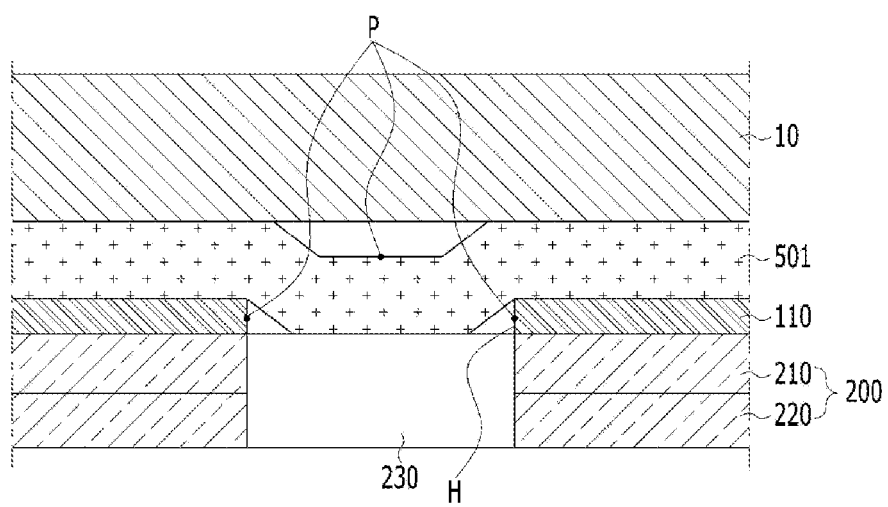
FIG. 8 is a view showing a comparative example in which only an OCA film is attached to the through hole, according to an embodiment.

FIG. 3 is a cross-sectional view of a substantial part of the display device according to the embodiment. FIG. 4 is a view showing a procedure in which OCR spray liquid shown in FIG. is applied to the through hole H formed in the upper polarization plate. FIG. 5 is a view showing a region in the through hole H in FIG. 4 to which the OCR spray liquid is sprayed. FIG. 6 is a view showing a procedure in which an OCR layer is cured by an ultraviolet lamp. FIG. 7 is a view showing a procedure in which an optical clear adhesive (OCA) film is attached to the cover glass in FIG. 3. FIG. 8 is a view showing a comparative example in which only an OCA film is attached to the through hole.

Referring to FIGS. 3 to 8, the realization of improvement of transparency for image capture by the camera 1, suppression of air gaps in the through hole H and enhancement of waterproof performance, which are achieved by the display device 1 according to some embodiments, will be described.

The display device 1 according to the embodiment may include an OCA film 500, disposed between the cover glass 10 and the upper polarization plate 110 and attached thereto, and an OCR layer 600 disposed in the through hole H in the upper polarization plate 110.

The OCA film 500 may be disposed between the cover glass 10 and the upper polarization plate 110 and attached thereto so as to improve luminance.

The Optical clear adhesive (OCA) film is an optically transparent adhesive. The OCA film has an advantage of allowing 97% or more of incident light to pass therethrough, like glass, and of improving definition of a screen compared to a piece of double-faced adhesive tape. The OCA film 500 is present in a solid state before and after attachment of the cover glass 10 to the upper polarization plate 110. The OCA film 500 may also be referred to as an optical adhesive film, an OCA sheet or an OCA.

The OCA film 500 may have, for example, a thickness of 150 μm to 250 μm.

When only an OCA film 501 is attached to the cover glass 10 and the upper polarization plate 110 as illustrated in FIG. 8, a portion of the OCA film 500 may droop toward the through hole H due to the through hole H in the polarization plate 110, with the result that a stepped portion is created in the OCA film 501, thereby generating air gaps (e.g., bubbles) between the layers such as between the OCA film 501 and the upper polarization plate 110, between the OCA film 501 and the transparent portion 230 of the liquid crystal panel 200, and/or between the cover glass 10 and the OCA film 501. Because the air gaps deteriorate the transparency and impair the waterproof performance, the image capture performance of the camera 2 may be deteriorated.

To solve this, the OCR layer 600 is disposed in the through hole H in the upper polarization plate 110 without voids.

The OCR, which is an ultraviolet curing agent for improving luminance, is excellent in transparency, adhesive force and weather resistance. The OCR layer 600, which is disposed in the through hole H, enhances the light transmissivity of the camera 2, and improves luminance and brightness, thereby improving visibility. In addition, the enhancement of light transmissivity offers additional effects of reducing the amount of power consumed for operation of the display and thus heat generation and of improving shock resistance.

When the OCR layer 600 is disposed in the through hole H, the contrast ratio is improved by 400% or more, with the result that there are advantages of realization of a clear image or prevention of a phenomenon whereby the liquid crystal display is not clearly visible under daylight condition. The OCR layer 600 may also be referred to as OCR direct bonding adhesive or simply as OCR. The OCR layer 600 is present in a liquid state before application but is present in a solid state after application and UV curing.

Since the OCR layer 600 is applied to the through hole H in the polarization plate 110 in such a way that an optical resin is densely charged, it is possible to make the display device 1 slim and to prevent the generation of air gaps attributable to voids.

For example, the OCR layer 600 may have a small thickness corresponding to the thickness of the upper polarization plate 110, that is, a thickness of 100 μm to 150 μm, which is smaller than the thickness of the OCA film 500.

As illustrated in FIGS. 4 and 5, the OCR layer 600 may be applied and charged in the through hole H in such a manner as to be sprayed toward a plurality of dots, which are spaced apart from each other at regular intervals. Here, the plurality of dots may be imaginary dots, which are located so as to enable the OCR layer 600 to be densely charged without gaps. The OCR may be sprayed as OCR spray liquid 610 in dot units through a jetting valve 700. Here, the OCR, which is sprayed in dot units through the jetting valve 700, will be referred to as the OCR spray liquid 610.

Figure 5A:
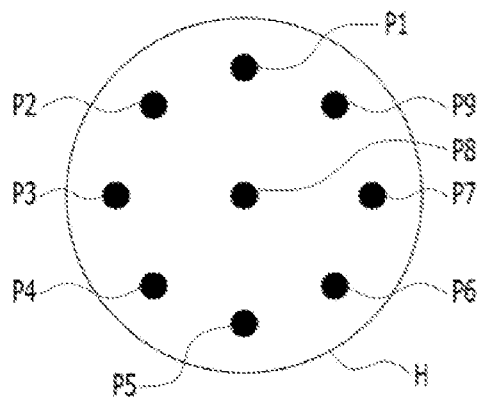
FIGS. 5A and 5B are views showing the region in the through hole in FIG. 4 to which the OCR spray liquid is sprayed, according to an embodiment.
Figure 5B:
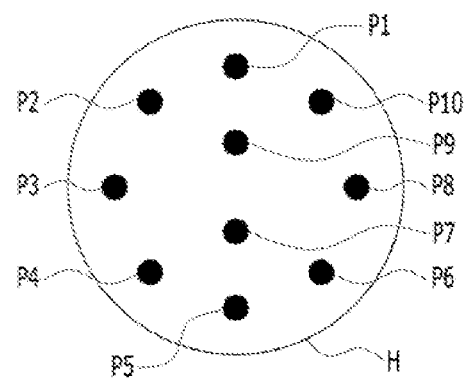

The plurality of dots for the OCR spray liquid 610 may be nine dots P1-P9, which are spaced apart from each other at regular intervals in the through hole H, as illustrated in FIG. 5A, or may be ten dots P1-P10, as illustrated in FIG. 5B. The above-described arrangement of the dots is merely an illustrative example, and the dots may be arranged in various numbers and dispositions as necessary.

The jetting valve 700 may be configured to be movable on the through hole H, and may discharge the OCT spray liquid 610 in an amount of 0.032 mg per one dot. The OCR spray liquid 610, which is sprayed to the dots, spreads out on the transparent portion 230 of the liquid crystal panel 200. Consequently, the OCR spray liquid 610 on the dots may be connected to each other, and thus may be densely charged in the through hole H.

The jetting valve 700 may spray the OCR spray liquid 610 once at each of the dots while moving on the through hole H. Alternatively, the jetting valve 700 may spray the OCR spray liquid 610 twice or more at each of the dots as necessary.

In order to allow the OCR spray liquid 610 to have a predetermined viscosity and to allow the OCR spray liquid sprayed on the dots to be connected to each other, the jetting valve 700 may spray the OCR spray liquid 610 at a temperature of 70° C.

After the OCR layer 600 is completely charged in the through hole H in the above manner, an operation of curing the OCR layer 600 is performed as illustrated in FIG. 6. In order to cure the OCR layer 600, an ultraviolet lamp 800 may be used.

After the OCR layer 600 is cured in the through hole H, an operation of attaching the OCA film 500 to the cover glass 10 is performed as illustrated in FIG. 7. Here, the OCA film 500 may be attached to the lower surface of the cover glass 10 using a jig 900 so as not to create an air gap.

After the OCA film 500 is attached to the lower surface of the cover glass 10, the upper polarization plate 110 with the through hole H being filled with the OCR layer 600 is closely combined with the OCA film 500 attached to the cover glass 10, as illustrated in FIG. 3.

In the narrow-bezel-type display device according to the embodiment, it is possible to realize improvement of transparency for image capture by the camera, suppression of creation of air gaps and improvement of waterproof performance by virtue of adoption of the OCA film 500 and the OCR layer 600.

Figure 9:
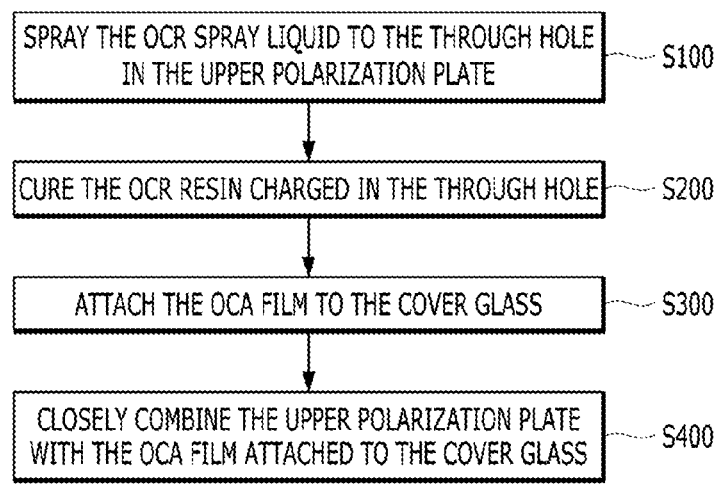
FIG. 9 is a flowchart illustrating a method of manufacturing the display device according to an embodiment.

FIG. 9 is a flowchart of the method of manufacturing the display device according to an embodiment.

Referring to FIG. 9, the method of manufacturing the display device according to the embodiment is carried out so as to firstly perform an operation (S100) of spraying the OCR spray liquid 610 to the through hole H in the upper polarization plate 110.

In the operation (S100), more specifically, the OCR spray liquid 610 is sprayed onto the transparent portion 230 of the liquid crystal panel 200 so as to fill the through hole H formed in the upper polarization plate 110 with the OCR layer 600. Here, the OCR layer 600 may be charged into the through hole H in such a manner that the OCR spray liquid 610 is sprayed to a plurality of dots on the transparent portion 230, which are spaced apart from each other at regular intervals. The number of the plurality of dots may be nine or ten. The OCR spray liquid 610 may be sprayed and charged while the jetting valve 700 moves along the plurality of dots.

The OCR layer 600 may be applied to an extent that corresponds to the thickness of the upper polarization plate 110. The applied OCR layer 600 may have, for example, a thickness of 100 μm to 150 μm.

Subsequently, an operation (S200) of curing the OCR layer 600 charged in the through hole H is performed.

Here, the OCR layer 600 charged in the through hole H may be cured using an ultraviolet lamp 800.

After the OCR layer 600 is cured, an operation (S300) of attaching the OCA film 500 to the cover glass 10 is performed. The OCA film 500 may have a thickness of 150 μm to 250 μm, and may be attached to the cover glass 10 using the jig.

After the OCA film 500 is attached to the cover glass 10, an operation (S400) of closely combining the upper polarization plate 110 with the OCA film 500 attached to the cover glass 10 is performed.

According to the method of manufacturing the narrow-bezel-type display device according to the embodiment, it is possible to realize improvement of transparency for image capture by the camera, suppression of creation of air gaps and improvement of waterproof performance by virtue of adoption of the OCA film 500 and the OCR layer 600.

The display device according to an embodiment may include a display panel such as an electroluminescence (EL) panel, a light-emitting diode (LED) panel, etc. The transparent portion of the display panel and the OCR layer disposed in the through hole H of the upper polarization plate on the display panel may correspond to each of optical modules. The optical modules may include cameras and various types of optical sensors, such as an infrared sensor, an illumination sensor, etc.

The display device according to an embodiment may be applied to various electronic devices, such as TVs, smart phones and tablet PCs.

As described above, according to the display device and the method of manufacturing the same according to an embodiment, it is possible to realize a narrow bezel, which offers improvement of transparency for image capture by the camera, suppression of creation of air gaps and improvement of waterproof performance by virtue of adoption of the OCA film and the OCR layer.

The features, configurations, effects and the like described above in the embodiments are included in at least one embodiment, but do not need to be limited only to the at least one embodiment. In addition, the features, configuration, effects and the like exemplified in the respective embodiments may be combined with other embodiments or modified by those skilled in the art. Accordingly, the content related to such combinations and modifications should be understood to fall within the scope of the embodiments.

What is claimed is:

1. A method of manufacturing a display device comprising:
   preparing a display panel and a polarization plate on the display panel, the display panel having a transparent portion and the polarization plate having a through hole corresponding to the transparent portion of the display panel;
   disposing an optical clear resin (OCR) layer in the through hole of the polarization plate, the OCR layer overlapping the transparent portion of the display panel without overlapping a non-transparent portion of the display panel;
   attaching an optically clear adhesive (OCA) film to a cover substrate; and
   combining the polarization plate with the OCA film attached to the cover substrate.

2. The method according to claim 1, wherein disposing the OCR layer in the through hole comprises:
   spraying OCR spray liquid onto the transparent portion of the display panel so as to charge the OCR layer in the through hole of the polarization plate; and
   curing the OCR layer.

3. The method according to claim 2, wherein the OCR layer is charged in the through hole of the polarization plate in such a manner that the OCR spray liquid is sprayed onto a plurality of dots on the transparent portion of the display panel, the plurality of dots being spaced apart from each other at regular intervals, and the OCR spray liquid spreads out on the transparent portion of the display panel.

4. The display device according to claim 3, wherein a number of the plurality of dots is nine or ten.

5. The display device according to claim 1, wherein the OCR layer has a same thickness as the polarization plate.

6. The display device according to claim 1, wherein the OCA film has a thickness of 150 μm to 250 μm and the OCR layer has a thickness of 100 μm to 150 μm.

7. The display device according to claim 1, wherein the OCR layer charged in the through hole is cured by ultraviolet light.

* * * * *